United States Patent
Jing

(10) Patent No.: US 8,819,157 B2
(45) Date of Patent: Aug. 26, 2014

(54) POINT-TO-POINT CHAT METHOD AND SYSTEM

(75) Inventor: Yunlong Jing, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 128 days.

(21) Appl. No.: 13/509,823

(22) PCT Filed: Jun. 29, 2010

(86) PCT No.: PCT/CN2010/074747
§ 371 (c)(1),
(2), (4) Date: May 15, 2012

(87) PCT Pub. No.: WO2010/149098
PCT Pub. Date: Dec. 29, 2010

(65) Prior Publication Data
US 2012/0221664 A1    Aug. 30, 2012

(30) Foreign Application Priority Data

Nov. 19, 2009    (CN) .......................... 2009 1 0109759

(51) Int. Cl.
*G06F 15/16* (2006.01)
*H04L 12/58* (2006.01)
*H04W 4/14* (2009.01)

(52) U.S. Cl.
CPC .................................. *H04W 4/14* (2013.01); *H04L 12/581* (2013.01)
USPC ............ 709/206; 709/203; 709/207; 370/352

(58) Field of Classification Search
CPC .............. H04L 67/04; H04L 29/12783; H04L 65/1016; G06F 15/16
USPC ................................... 709/206, 207; 370/352
See application file for complete search history.

(56) References Cited

U.S. PATENT DOCUMENTS

| | | | | |
|---|---|---|---|---|
| 6,064,880 | A  * | 5/2000 | Alanara ......................... | 455/419 |
| 6,204,808 | B1 * | 3/2001 | Bloebaum et al. ........ | 342/357.42 |
| 6,477,644 | B1 * | 11/2002 | Turunen ........................ | 713/161 |

(Continued)

FOREIGN PATENT DOCUMENTS

| CN | 101573996 A | 11/2009 |
|---|---|---|
| CN | 101730018 A | 6/2010 |

(Continued)

OTHER PUBLICATIONS

International Search Report for PCT/CN2010/074747, English Translation attached to original, Both completed by the Chinese Patent Office on Sep. 24, 2010, All together 8 Pages.

*Primary Examiner* — Tesfay Yohannes
(74) *Attorney, Agent, or Firm* — Brooks Kushman P.C.

(57) ABSTRACT

A point-to-point chat system and method are provided. The system comprises a USSD (Unstructured Supplementary Service Data) signaling interface unit and a chat control unit. The USSD signaling interface unit is configured to receive a USSD chat request message of an inviting party and a USSD chat joining message of an invited party via a core network, and to forward the USSD chat request message and the USSD chat joining message to the chat control unit. The chat control unit is configured to send a chat inviting message to the invited party after receiving the USSD chat request message, to start the chat after receiving the USSD chat joining message, and to receive chat information of the inviting party or the invited party to forward to the other party of the inviting party or the invited party.

10 Claims, 2 Drawing Sheets

(56) References Cited

U.S. PATENT DOCUMENTS

| | | | |
|---|---|---|---|
| 2003/0065738 A1* | 4/2003 | Yang et al. | 709/215 |
| 2004/0015553 A1* | 1/2004 | Griffin et al. | 709/206 |
| 2006/0010201 A1* | 1/2006 | Roskowski et al. | 709/204 |
| 2006/0114882 A1* | 6/2006 | Mills | 370/352 |
| 2006/0248149 A1* | 11/2006 | Kraft et al. | 709/206 |
| 2006/0248157 A1* | 11/2006 | Daniell et al. | 709/207 |
| 2006/0285670 A1* | 12/2006 | Chin et al. | 379/201.01 |
| 2008/0117893 A1 | 5/2008 | Witzel et al. | |
| 2008/0132259 A1* | 6/2008 | Vin | 455/466 |
| 2009/0276495 A1* | 11/2009 | Izumi | 709/206 |
| 2011/0078248 A1* | 3/2011 | Harpur et al. | 709/206 |

FOREIGN PATENT DOCUMENTS

| | | |
|---|---|---|
| WO | 2008104835 | 9/2008 |
| WO | 2009127873 A1 | 10/2009 |

\* cited by examiner

POINT-TO-POINT CHAT METHOD AND SYSTEM

CROSS-REFERENCE TO RELATED APPLICATION

This application is the U.S. national phase of PCT Appln. No. PCT/CN2010/074747 filed Jun. 29, 2010 which claims priority to Chinese Application No. 200910109759.2 filed Nov. 19, 2009, the disclosures of which are incorporated in their entirety by reference herein.

TECHNICAL FIELD

The present invention relates to the mobile communication field, and in particular, to a point-to-point chat method and system.

BACKGROUND ART

At present, the implementation of the point-to-point chat technology is mainly based on the GPRS (General Packet Radio Service) technique in the internet or the mobile communication. Point-to-point chat based on the internet requires various network resources, while point-to-point chat based on GPRS via IP (Internet Protocol) requires the support of GPRS data networks.

USSD (Unstructured Supplementary Service Data) is a new interactive data service based on GSM (Global System for Mobile Communications) networks. Using the USSD technology to transmit data does not need large-scale modification of existing mobile networks, therefore the cost is low and the response speed is fast. Operators can flexibly launch various USSD function services for specific situations of local networks to provide services for mobile users conveniently. The USSD technology is mainly used for various value-added services of mobile communication, such as account query, service customization, information query and confirmation, etc.

At present, compared with a data transmission mode based on the internet or GPRS, the USSD technology has great advantages in cost and application mode. In addition, most operators provide a USSD access function, and mobile communication networks can support USSD protocols as well. However, various advantages of the USSD technology in message transmission function have not been utilized fully, and application of the USSD technology in the field of point-to-point chat is still a blank.

SUMMARY OF THE INVENTION

The present invention provides a point-to-point chat method and system with low cost and flexible application.

A technical scheme used by present invention to solve its technical problem is to provide a point-to-point chat system comprising a USSD signaling interface unit and a chat control unit.

The USSD signaling interface unit is configured to receive a USSD chat request message of an inviting party and a USSD chat joining message of an invited party via a core network, and to forward the USSD chat request message and the USSD chat joining message to the chat control unit.

The chat control unit is configured to send a chat inviting message to the invited party after receiving the USSD chat request message, to start the chat after receiving the USSD chat joining message, and to receive chat information of the inviting party or the invited party to forward to the other party of the inviting party or the invited party.

The USSD signaling interface unit is further configured to implement chat information interaction between the chat control unit and the inviting party or the invited party when the chat control unit receives the chat information of the inviting party or the invited party to forward to the other party of the inviting party or the invited party.

Preferably, the system in accordance with the present invention further comprises a short message interface unit; the chat control unit is further configured to notify the short message interface unit to send the chat inviting message after receiving the USSD chat request message; and the short message interface unit is configured to send the chat inviting message to the invited party via a short message center.

Preferably, the system in accordance with the present invention further comprises a chat configuration unit configured to perform configuration management of the chat control unit.

Preferably, the chat control unit comprises a resource allocation module configured to assign a chat session number to the chat, and to allocate a corresponding data block to the chat from a chat session pool.

Preferably, the chat control unit further comprises a timing module configured to cancel the chat when the USSD chat joining message is not received within a preset period of time; in addition, the timing module is further configured to end the chat when the chat information of the inviting party or the invited party is not received within a preset period of time.

The present invention also provides a point-to-point chat method comprising the following steps of:

a USSD signaling interface unit receiving a USSD chat request message of an inviting party via a core network to send to a chat control unit;

the chat control unit receiving the USSD chat request message from the USSD signaling interface unit, and sending a chat inviting message to an invited party;

the chat control unit receiving a USSD chat joining message of the invited party and starting the chat; and the chat control unit receiving chat information of the inviting party or the invited party to forward to the other party of the inviting party or the invited party.

Preferably, the chat control unit assigns a chat session number to the chat after receiving the USSD chat request message, and allocates a corresponding chat data block to the chat from a chat session pool.

When the chat control unit sends the chat inviting message to the invited party, the chat session number is contained in the chat inviting message.

The step of the chat control unit receiving the USSD chat joining message of the invited party and starting the chat comprises: the USSD chat joining message carrying the chat session number, and the chat control unit associating the chat information of the inviting party and the invited party with the chat data block corresponding to the chat information in the chat session pool by querying the chat session number.

Preferably, the chat control unit further queries whether chat resources are adequate after receiving the USSD chat request message, and sends the chat inviting message to the invited party if the chat resources are adequate.

The beneficial effect of the present invention is that the present invention makes full use of advantages of the USSD technology, effectively reduces the cost of point-to-point chat, and improves the response speed, and its application mode is very flexible.

The present invention also utilizes a short message center to send the chat inviting message to the invited party, and controls start and end of the chat by a timing mechanism, thereby facilitating usage and further improving user satisfaction.

PREFERRED EMBODIMENTS OF THE PRESENT INVENTION

The specific embodiments of the present invention will be described in combination with accompanying drawings.

Figure 1:
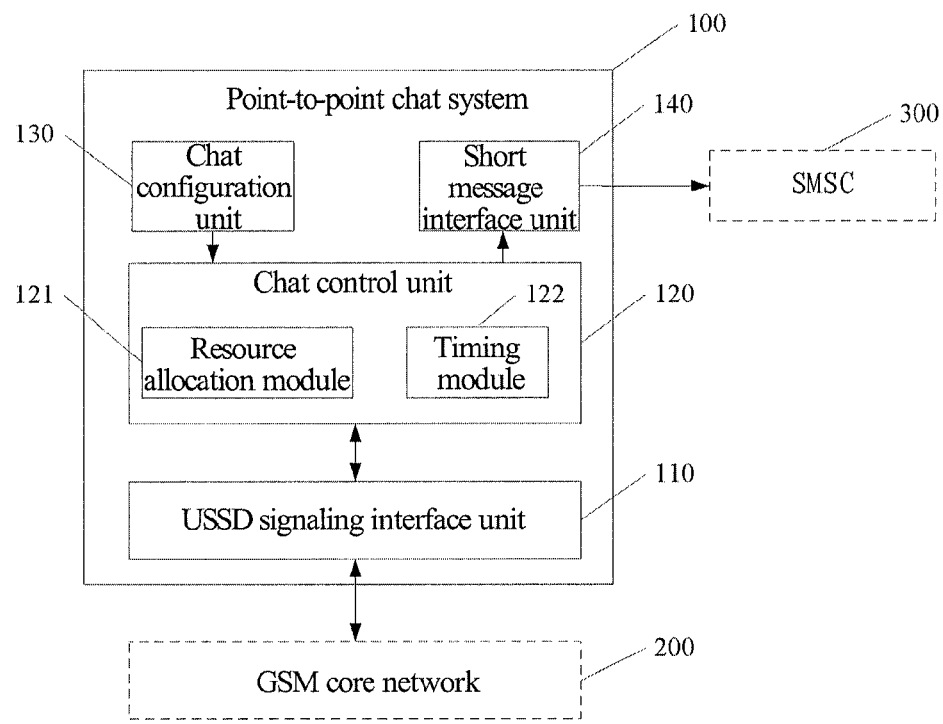
FIG. 1 is a block diagram of a point-to-point chat system in accordance with the present invention.

The present invention provides a point-to-point chat system and method based on the USSD technology. As shown in FIG. 1, a point-to-point chat system 100 in accordance with a specific embodiment comprises a USSD signaling interface unit 110, a chat control unit 120, a chat configuration unit 130 and a short message interface unit 140.

In the following embodiments, it is assumed that a party initiating a chat request through the system is an inviting party, and a party which is invited to chat is an invited party.

The USSD signaling interface unit 110 comprises a plurality of physical interfaces to connect communication networks supporting different signaling protocols, including signaling channels supporting USSD protocols. This unit is configured to receive a USSD chat request message of the inviting party via a HLR (Home Location Register) in a core network 200, and to decode the USSD chat request message to obtain protocol data above a SCCP (Signaling Connection Control Part) layer, and then to send the decoded and encapsulated USSD chat request message to the chat control unit 120 via an internal interface of the system.

The chat control unit 120, as a core control unit of the system, is configured to send a chat inviting message to the invited party after receiving the USSD chat request message of the inviting party. Specifically, the chat control unit 120 queries whether chat resources in the system are adequate after receiving the USSD chat request message, and if the chat resources are adequate, allocates a chat session ID (a chat session code) and a chat data block to the chat, notifies a short message interface unit 140 to send the chat inviting message, and then the short message interface unit 140 sends the chat inviting message to the invited party via a short message center (SMSC) 300.

The invited party sends a USSD chat joining message to the USSD signaling interface unit 110 when agreeing to chat with the inviting party. The USSD signaling interface unit 110 is further configured to forward the USSD chat joining message to the chat control unit 120.

The chat control unit 120 is further configured to start the chat when receiving the USSD chat joining message, that is, to associate chat information of the inviting party and the invited party with a chat data block corresponding to the chat information in a chat session pool such that the both parties can chat smoothly.

During the chat, the chat control unit 120 is configured to receive the chat information of the inviting party or the invited party to forward to the other party of the inviting party or the invited party. Because data transmission of the chat information of the present invention is implemented through USSD protocols, chat information interaction between the chat control unit 120 and the inviting party or the invited party can be still completed by the USSD signaling interface unit 110 or a separate functional module.

When the USSD signaling interface unit 110 receives data of the HLR from the core network 200, processing of the data is the same as that of the USSD chat request message. When sending data to the corresponding HLR in the core network 200, the USSD signaling interface unit 110 encapsulates, based on the allocated chat session ID, the chat information from the chat control unit 120 into the related underlying signaling protocol at the corresponding SCCP layer to send to the corresponding HLR.

The chat control unit 120 further comprises a resource allocation module 121 and a timing module 122.

The resource allocation module 121 is configured to assign a chat session ID to the chat, and to allocate a corresponding chat data block to the chat from a chat session pool.

The timing module 122 is configured to control start and end of a chat by a timing mechanism. When initiating a chat, the chat control unit 120 cancels the chat if a USSD chat joining message is not received within a preset period of time. During the chat, the chat control unit 120 ends the chat if chat information of the inviting party or the invited party is not received within a preset period of time.

Furthermore, the chat control unit 120 further needs to manage a chat process, such as forwarding of the chat information of both parties and session process management, between the inviting party and the invited party. Whenever a chat ends, the chat control unit 120 can also gather the chat information between the inviting party and the invited party so as to count statistical service utilization ratios. The chat control unit 120 can also accept management of the chat configuration unit 130 to implement system data management, service loading and statistical information maintenance.

The chat configuration unit 130 is configured to perform configuration management of the chat control unit 120, mainly including configuration and management of system level data, allocation management of the chat session pool, timing management, service statistics management, system log management, etc.

The configuration and management of the system level data mainly means that the chat control unit 120 can work normally by system configuration.

The allocation management of the chat session pool is configured to configure the number of chats processed by the system simultaneously.

The timing management is to set the preset period of time of the timing module 122, and manage the USSD chat joining message and chat information of a user by configuring a timer reasonably. For example, the system automatically identifies the chat information received beyond the preset period of time as the end of the chat.

The service statistics management is to gather system resources occupied by the chat function of the system to provide statistical data of system application situations and the relevant KPI (Key Performance Indicators) from system users (mainly operators) so as to manage decisions.

The system log management mainly records operation situations of the system such that a system administrator can maintain the system conveniently.

Figure 2:
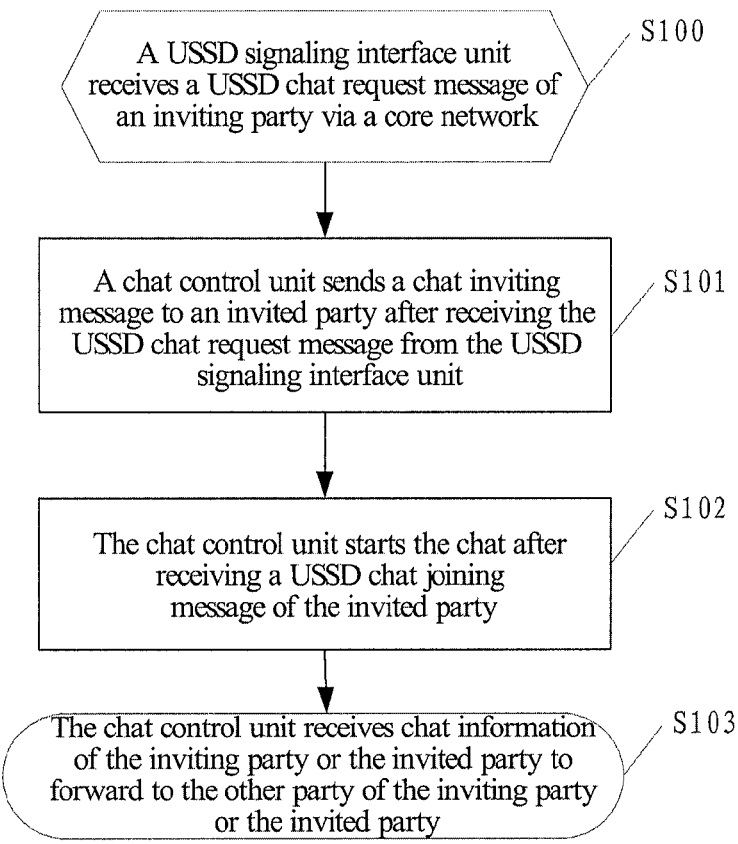
FIG. 2 is a flow chart of a point-to-point chat method in accordance with the first embodiment of the present invention.

As shown in FIG. 2, a point-to-point chat method in accordance with an embodiment comprises the following steps.

In step S100, a USSD signaling interface unit 110 receives a USSD chat request message of an inviting party via a core network 200, and sends USSD chat information to a chat control unit 120 after decoding and encapsulating the USSD chat request message.

In step S101, the chat control unit 120 sends a chat inviting message containing an assigned chat session ID to an invited party after receiving the USSD chat request message from the USSD signaling interface unit 110.

In step S102, the chat control unit 120 starts the chat after receiving a USSD chat joining message of the invited party. Specifically, in the starting process, the USSD chat joining message carries the assigned chat session ID, and the chat control unit 120 associates chat information of the inviting party and the invited party with a chat data block corresponding to the chat information in a chat session pool by querying the chat session ID.

In step S103, the chat starts, that is, the chat control unit 120 receives the chat information of the inviting party or the invited party to forward to the other party of the inviting party or the invited party.

Figure 3:
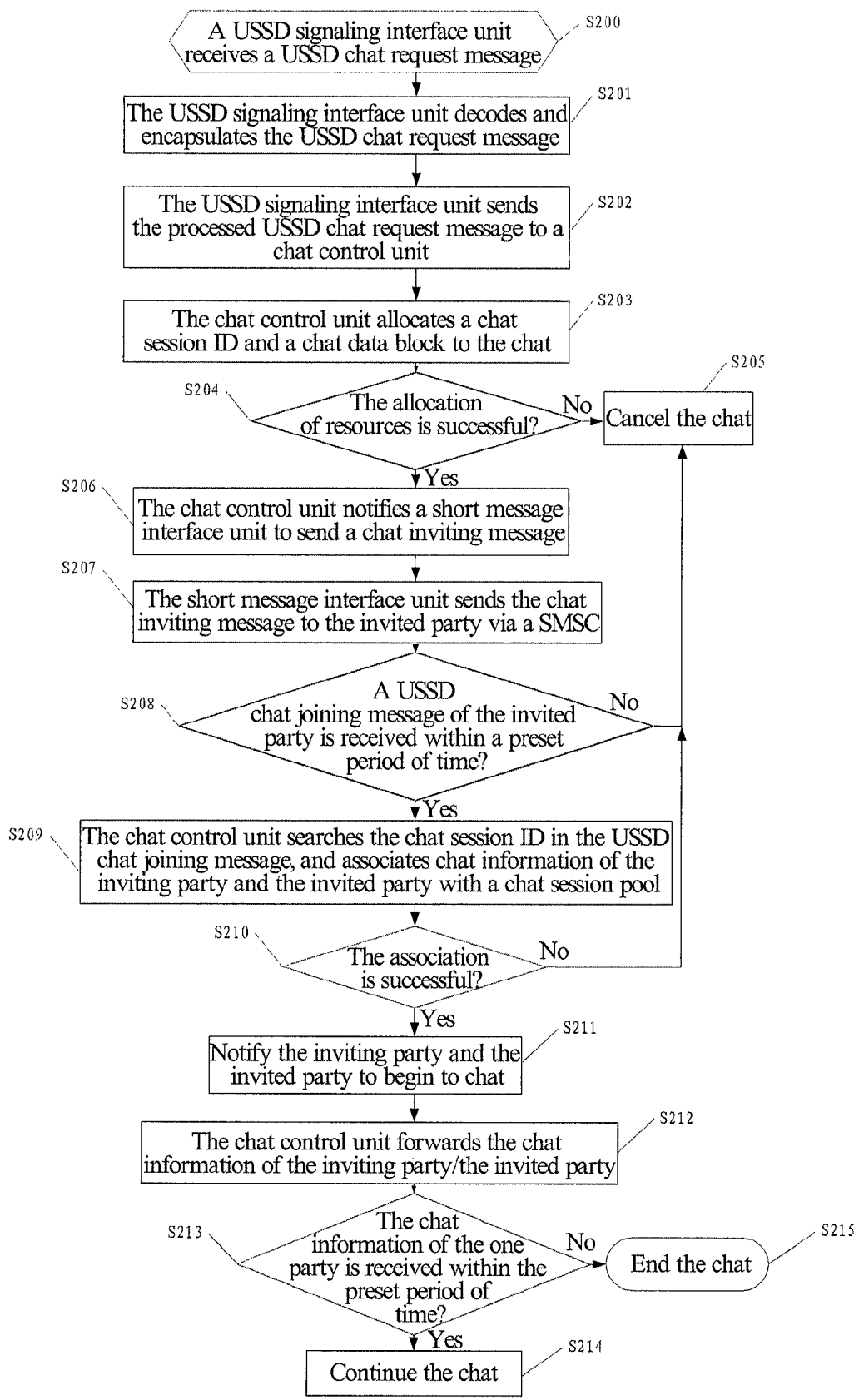
FIG. 3 is a flow chart of a point-to-point chat method in accordance with the second embodiment of the present invention.

As shown in FIG. 3, another embodiment of the present invention comprises the following steps.

In step S200, a USSD signaling interface unit 110 receives a USSD chat request message of an inviting party via a core network 200.

In step S201, the USSD signaling interface unit 110 decodes and encapsulates the USSD chat request message. Specifically, the USSD signaling interface unit 110 decodes and encapsulates the USSD chat request message accordingly, and extracts data above a SCCP layer therefrom, to compose a complete USSD data packet.

In step S202, the USSD signaling interface unit 110 sends the processed USSD chat request message to a chat control unit 120 in a form of USSD data packet.

In step S203, the chat control unit 120 assigns a chat session ID to the chat and allocates a corresponding chat data block to the chat from a chat session pool after receiving the USSD chat request message.

In step S204, during the allocation process described above, the chat control unit 120 needs to query chat resources (i.e., the chat session ID and the chat session pool), and it is determined whether the allocation of the resources is successful, and if yes, step S206 is performed, otherwise, step S205 is performed.

In step S205, the chat is cancelled, and a USSD chat cancel message is also sent to the inviting party, and then the related resources of the system are returned.

In step S206, if the chat resources are adequate, the chat control unit 120 notifies a short message interface unit 140 to send a chat inviting message containing a chat session ID pre-allocated by the chat control unit 120 to the invited party.

In step S207, the short message interface unit 140 sends the chat inviting message, a number of which is a phone number of the invited party, to the invited party via a SMSC, and starts the timing module 122.

In step S208, it is determined whether the chat control unit 120 receives a USSD chat joining message from the invited party via the USSD signaling interface unit 110 within a preset period of time, and if yes, step S209 is performed, otherwise, step S205 is performed.

In step S209, the chat control unit 120 receives the USSD chat joining message, a USSD access code of which, similar to the USSD chat request message, is a chat application access code. The content of the USSD chat joining message carries the pre-allocated chat session ID. The chat control unit 120 searches the chat session ID in the USSD chat joining message, and associates chat information of the inviting party and the invited party with a corresponding chat data block in a chat session pool.

In step S210, it is determined whether the association is successful, and if yes, step S211 is performed, otherwise, step S205 is performed.

In step S211, the inviting party and the invited party are notified to begin to chat via the USSD signaling interface 110, and the chat is started.

In step S212, the chat control unit 120 receives the chat information of the inviting party or the invited party to forward to the other party of the inviting party or the invited party via the USSD signaling interface unit 110.

In step S213, during the chat, it is determined by starting the timing module 122 whether the chat information of the inviting party or the invited party is received within the preset period of time, and if yes, step S214 is performed, otherwise, step S215 is performed.

In step S214, the chat continues.

In step S215, the chat ends, and a USSD chat end message is also sent to both the inviting party and the invited party, and then the related resources of the system are returned.

The point-to-point chat system and method in accordance with the present invention are based on the USSD technology. Since most of the current operators provide services supporting the USSD access function and the existing core networks are not required to be modified in the present invention, the present invention makes full use of advantages of the USSD technology, its cost is low, its application mode is flexible and its response speed is fast.

The present invention also utilizes a short message center to send the chat inviting message to the invited party, and controls start and end of the chat by a timing mechanism, thereby facilitating usage and further improving user satisfaction.

The above is detailed description of the present invention made in conjunction with the specific and preferred embodiments, and is not intended to limit the specific embodiments of the present invention to the description. Various simple deductions or substitutions may be also made by those skilled in the art to which the present invention belongs without departing from the concept of the present invention, and should belong to the protection scope of the present invention.

INDUSTRIAL APPLICABILITY

Compared with the existing technology, the present invention makes full use of advantages of the USSD technology, effectively reduces the cost of point-to-point chat, and improves the response speed, and its application mode is very flexible. The present invention also utilizes a short message center to send the chat inviting message to an invited party, and controls start and end of the chat by a timing mechanism, thereby facilitating usage and further improving user satisfaction.

What is claimed is:
1. A point-to-point chat system comprising:
a processor;
a USSD signaling interface means;
a chat control means; and
a short message interface means;
wherein the USSD signaling interface means is adapted for receiving a USSD chat request message of an inviting party via a Home Location Register (HLR) in a core network, and forwarding the USSD chat request message to the chat control means;

the chat control means is adapted for: allocating a chat session code and a chat data block, and notifying the short message interface means to send a chat inviting message to the invited party after receiving the USSD chat request message;

the short message interface means is adapted for sending the chat inviting message to the invited party via a short message center (SMSC);

the USSD signaling interface means is further adapted for receiving a USSD chat joining message from the invited party via the HLR in the core network, and forwarding the USSD chat joining message to the chat control means;

the chat control means is further adapted for, according to the allocated chat session code and the allocated chat data block, starting chat between the inviting party and the invited party after receiving the USSD chat joining message; and for receiving chat information which is forwarded by the USSD signaling interface means and is from the inviting party via the HLR and sending the received chat information from the inviting party to the invited party via the USSD signaling interface means and the HLR in turn, and receiving other chat information which is forwarded by the USSD signaling interface means and is from the invited party via the HLR and sending the received other chat information from the invited party to the inviting party via the USSD signaling interface means and the HLR in turn;

wherein, the USSD signaling interface means is further adapted for: decoding the USSD chat request message, the USSD chat joining message and the chat information, which are forwarded to the chat control means, to extract data above a Signaling Connection Control Part (SCCP) layer therefrom and then encapsulating to compose a complete USSD data packet correspondingly; and for encapsulating the chat information which is sent to the HLR, into related underlying signaling protocol at the corresponding SCCP layer based on the allocated chat session code.

2. The system according to claim 1, further comprising a chat configuration means for performing configuration management of the chat control means, wherein the configuration management at least includes configuration and management of system level data, allocation management of a chat session pool, timing management, service statistics management, system log management.

3. The system according to claim 1, wherein the chat control means comprises a resource allocation module for allocating the chat session code to the chat, and allocating the corresponding chat data block to the chat from a chat session pool.

4. The system according to claim 3, wherein the chat control means further comprises a timing module for canceling the chat when the USSD chat joining message is not received within a preset period of time.

5. The system according to claim 4, wherein the timing module is further adapted for ending the chat when the chat information of the inviting party or the invited party is not received within a preset period of time.

6. A point-to-point chat method comprising the following steps of:

a USSD signaling interface means receiving a USSD chat request message of an inviting party via a Home Location Register (HLR) in a core network to send to a chat control means;

the chat control means receiving the USSD chat request message from the USSD signaling interface means, allocating a chat session code and a chat data block, and notifying a short message interface means to send a chat inviting message to the invited party;

the short message interface means sending the chat inviting message to the invited party via a short message center (SMSC);

the USSD signaling interface means receiving a USSD chat joining message from the invited party via the HLR in the core network, and forwarding the USSD chat joining message to the chat control means;

the chat control means receiving the USSD chat joining message of the invited party, and starting a chat between the inviting party and the invited party according to the allocated chat session code and the allocated chat data block; and the chat control means receiving chat information which is forwarded by the USSD signaling interface means and is from the inviting party or the invited party via the HLR; and sending the received chat information from the inviting party to the invited party via the USSD signaling interface means and the HLR in turn, and receiving other chat information which is forwarded by the USSD signaling interface means and is from the invited party via the HLR and sending the received other chat information from the invited party to the inviting party via the USSD signaling interface means and the HLR in turn; and the method further comprising:

the USSD signaling interface means decoding the USSD chat request message, the USSD chat joining message and the chat information, which are forwarded to the chat control means, to extract data above a Signaling Connection Control Part (SCCP) layer therefrom and then encapsulating to compose a complete USSD data packet correspondingly; and the USSD signaling interface means encapsulating the chat information which is sent to the HLR, into related underlying signaling protocol at the corresponding SCCP layer based on the allocated chat session code.

7. The method according to claim 6, the step of allocating a chat session code and a chat data block to the chat specific comprising the chat control means allocating the chat session code to the chat after receiving the USSD chat request message, and allocating the corresponding chat data block to the chat from a chat session pool; wherein in the step of the chat control means sending the chat inviting message to the invited party, the chat session number is contained in the chat inviting message; and the step of the chat control means receiving the USSD chat joining message of the invited party and starting the chat comprises: the USSD chat joining message carrying the chat session code, and the chat control means associating the chat information of the inviting party and the invited party with the chat data block corresponding to the chat information in the chat session pool by querying the chat session code.

8. The method according to claim 6, further comprising the chat control means querying whether chat resources are adequate after receiving the USSD chat request message, and sending the chat inviting message to the invited party if the chat resources are adequate.

9. The method according to claim 7, further comprising the chat control means querying whether chat resources are adequate after receiving the USSD chat request message, and sending the chat inviting message to the invited party if the chat resources are adequate.

10. The system according to claim 2, wherein, the configuration and management of the system level data is that the chat control means can work normally by system configuration;
the allocation management of the chat session pool is to configure number of chats processed by the system simultaneously;
the timing management is to set the preset period of time of a timing module, and manage the USSD chat joining message and the chat information of a user by configuring a timer;
the service statistics management is to gather system resources occupied by the chat function of the system to provide statistical data of system application situations and relevant KPI (Key Performance Indicators) from system users so as to manage decisions;
the system log management records operation situations of the system such that a system administrator can maintain the system conveniently.

* * * * *